United States Patent
Werner

(10) Patent No.: US 7,562,687 B2
(45) Date of Patent: Jul. 21, 2009

(54) TIRE MOUNTING LEVER HAVING A CURVED MOUNTING SURFACE

(75) Inventor: Oliver Werner, Munich (DE)

(73) Assignee: Beissbarth GmbH, Munich (DE)

( * ) Notice: Subject to any disclaimer, the term of this patent is extended or adjusted under 35 U.S.C. 154(b) by 38 days.

(21) Appl. No.: 11/557,471

(22) Filed: Nov. 7, 2006

(65) Prior Publication Data

US 2007/0240830 A1 Oct. 18, 2007

(30) Foreign Application Priority Data

Nov. 8, 2005 (DE) .................. 20 2005 017 444 U

(51) Int. Cl.
*B60C 25/04* (2006.01)
(52) U.S. Cl. .......................... 157/1.3; 157/1
(58) Field of Classification Search ............ 157/1, 157/1.17, 1.3, 1.49; 81/3.55; 7/100
See application file for complete search history.

(56) References Cited

U.S. PATENT DOCUMENTS

| 748,953 | A | * | 1/1904 | Jacobs | 157/1.3 |
|---|---|---|---|---|---|
| 1,454,320 | A | * | 5/1923 | Jenkins | 157/1.3 |
| 2,503,683 | A | * | 4/1950 | Perkins | 81/3.55 |
| 4,133,363 | A | * | 1/1979 | Gardner | 157/1.3 |
| 5,971,052 | A | * | 10/1999 | Kliskey | 157/1 |
| 2004/0129388 | A1 | * | 7/2004 | Brazil | 157/1.3 |
| 2006/0179978 | A1 | * | 8/2006 | Rocks | 81/3.55 |

FOREIGN PATENT DOCUMENTS

DE 9211934.4 11/1992

* cited by examiner

*Primary Examiner*—Hadi Shakeri
(74) *Attorney, Agent, or Firm*—Dorsey & Whitney LLP

(57) ABSTRACT

A mounting lever (1) according to one embodiment of the invention for dismantling a vehicle tire from a rim comprises a rod-formed handle portion (101) and a work portion (102) provided at its front end. The work portion (102) has a convex mounting surface (11).

5 Claims, 2 Drawing Sheets

TIRE MOUNTING LEVER HAVING A CURVED MOUNTING SURFACE

TECHNICAL FIELD

The invention relates to a mounting lever for vehicle tires.

BACKGROUND OF THE INVENTION

Modern tires with emergency running properties have a reinforced tire wall and are used with rims comprising so called "extended humps." Such tires must, on the one hand, carry at least a fourth of the vehicle weight, and may, on the other hand, not hop from the rim when driving with tire pressure that is too low.

To dismantle such tire from a rim, the tire is often claimed onto a disk machine. By use of a mounting lever, the heel of the tire is moved from the rim over a mounting head positioned at the wheel flange, which subsequently removes the tire from the rim supported by the rotational movement of the disk. To dismantle such tire from the rim, the heel of the tire must be pushed outwards with a force of approximately 600 N. With the commercially available mounting levers e.g. with the mounting lever known from the German Utility Model G 92 11 934.4, the heel of the tire is often damaged at the same time.

There is therefore a need for a mounting lever by use of which damages can be reliably avoided when dismantling a tire from the rim.

SUMMARY OF THE INVENTION

Such a mounting lever according to the invention comprises a rod-formed handle portion and a working portion provided at its front end having a convex profiled mounting surface.

According to a basic idea of the invention a mounting lever is appropriately profiled such that it comprises a convex mounting surface, which is capable in its use to avoid excessive tensions between mounting lever and heel of the tire. Thus damages when dismantling the tires are prevented. Such a mounting lever is suitable for the damageless dismantling of tires, especially of tires having a reinforced side wall. Cuts and pressure marks in the heel of tire which result from the use of commercially available mounting levers at the upper edges of the mounting lever due to strong punctiform stress are thereby reliably avoided. With conventional mounting levers, the heel of the tire rests with very low pressure between the corner points of the mounting lever, and no real form closure is accomplished. This effect does not depend in the first instance from the material strength of the used mounting lever, but rather mainly from its form.

When the curvature of the convex mounting surface or the profile of the cross section of the mounting lever approximately corresponds to the course of the edge of the heel of the tire when dismantling, damages when dismantling tires can be avoided even more reliably, since the heel of the tire is stressed at a point of time of the highest force effect uniformly over the whole width of the mounting lever and accordingly it results in a more homogeneous distribution of forces. Thus the pressure of the heel of the tire decreases and structural damages due to punctiform tensions of the heel of the tire especially at the edges of the mounting lever are avoided.

When a rounded end part is provided at the front end of the working portion, the mounting lever can be inserted particularly protectively between the rim and the heel of the tire, and the mounting lever does not damage the inner side of the running tread.

Tires can be mounted or removed particularly protectively, when the profile of the working portion changes towards its middle into another form and especially, when the handle portion of the mounting lever comprises a substantially rectangular profile, which changes in the working portion into a convex profile.

It is particularly advantageous, when the convex profile of the mounting lever changes in the working portion towards the rounded end part of the working portion into a substantially rectangular profile again.

Particularly protective for the tire is a mounting lever which is developed further according to the invention, in which mounting lever the convexity of the working portion changes over its length and in which mounting lever the convexity of the working portion is developed strongest in its middle. There the course of the convex mounting surface approximates the course of the edge of the heel of the tire.

In a further advantageous embodiment of the invention the mounting lever is angled slightly upwards at its front end. Thus the mounting lever can be inserted between the rim and the heel of the tire particularly well. In the normal case the mounting lever is straight, however an angled end makes sense as an embodiment.

In a further advantageous embodiment of the invention the mounting lever comprises only on one part of its working surface a profile corresponding to the course of the heel of the tire, and has a rectangular profile in the remaining part.

In a further advantageous embodiment of the invention the mounting lever is configured hook-formed at its back end. Thus the mounting lever can particularly well be held and fixed e.g. at the tire flange.

In a further advantageous embodiment of the invention the mounting lever is made of chrome vanadium, a particularly high quality material which lends the mounting lever advantageous characteristics, like immunity to corrosion and a particular solidity.

Recapitulating, it can be said that due to the various tire hardnesses and tire diameters as well as forms of mounting heads the profiling of the mounting lever can only be a matter of compromise, if not a separate mounting lever is to be provided for each single application. In the test of the most critical rim-tire-combinations, especially tires of dimensions 16, 18 and 20 inches with problematic steel and aluminum rims and tires that are particularly difficult to dismantle, it has been shown that the mounting lever profiled according to the invention works entirely without damages.

BRIEF DESCRIPTION OF THE DRAWINGS

An embodiment of the invention will be explained by means of the following description, wherein the Figures depict the following.

DETAILED DESCRIPTION OF PREFERRED EMBODIMENTS

Figure 1:
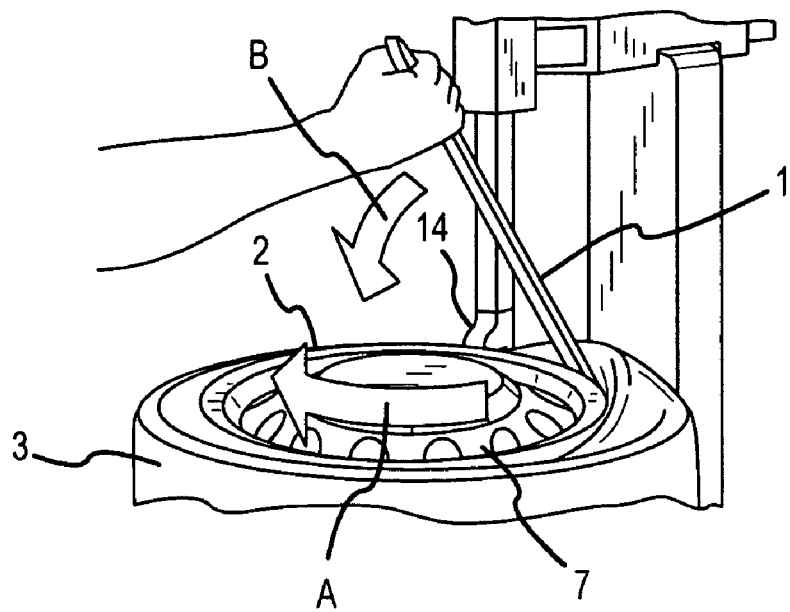
FIG. 1 is an isometric view of a disk machine that is being used to dismantle a tire from a rim using a mounting lever.

As shown in FIG. 1, a disk machine is being used to dismantle a tire 3 from a rim 2 using a mounting lever 1. Such disk machines are known to the person skilled in the art. The tire 3 is clamped onto a rotatable disk (not shown in FIG. 1) on which the tire 3 is placed. The disk machine includes a mounting head 14 having a gibbet.

To remove the tire 3 from the rim 2, the front end of the mounting lever 1 is inserted between the rim 2 and the tire 3. In doing so it is necessary for the tire 3 to rest in the base rim at the opposite side of the mounting head 14. The tire 3 is subsequently lifted over the mounting head 14 by lowering the back end of the mounting lever 1 in the direction of the arrow B, such that it sits between the heel of the tire and a flange 7 of the wheel. After pulling out the mounting lever 1 down, the disk is rotated with the rim 2 in the direction of the arrow A to remove the tire 3 from the rim 2.

Figure 2:
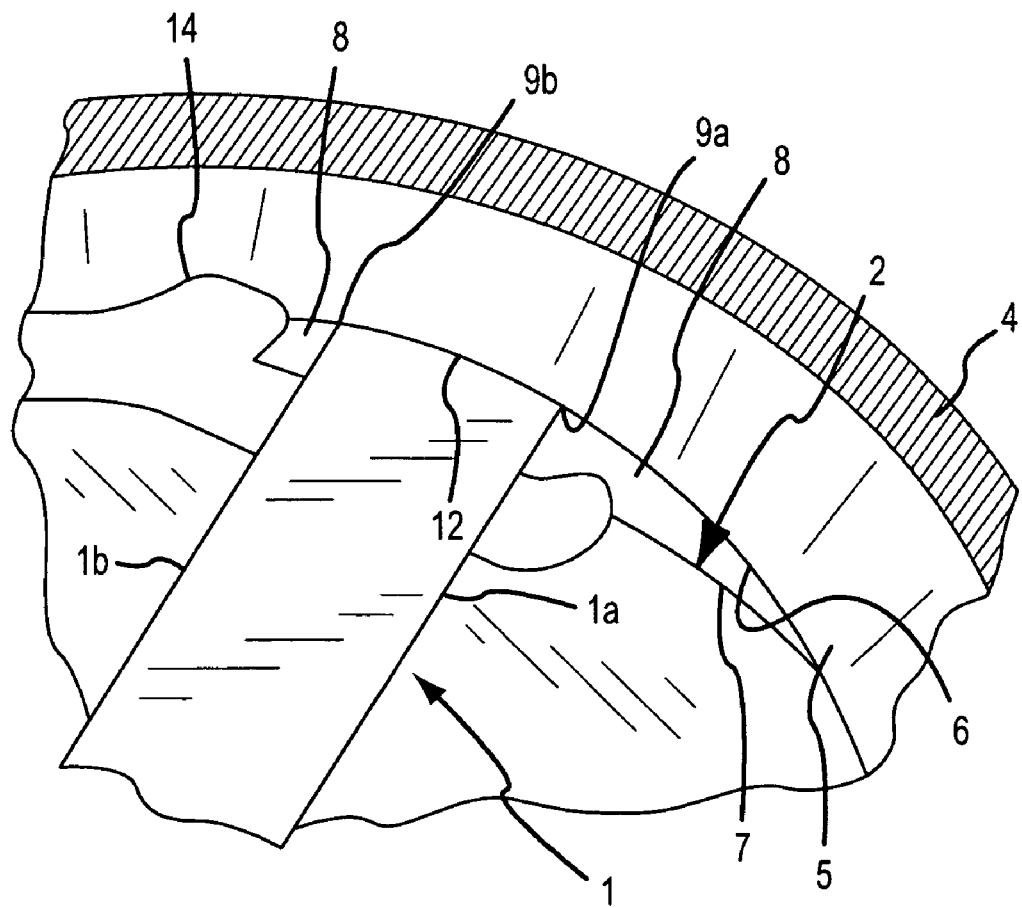
FIG. 2 is a top plan view showing an enlarged section from FIG. 1.

The manner in which the mounting lever 1 engages the rim 2 and tire 3 to lift the tire 3 over the mounting head 14 is shown in greater detail in FIG. 2. The upper portion of FIG. 2 also shows the tire 3 having a running tread 4, a side wall, 5 and a heel 6, which forms the lower edge of the side wall 5. The lower portion of FIG. 2 also shows the rim 2 and a wheel flange 7, which limits the upward movement of the rim 2. To dismantle the tire 3 from the rim 2, the mounting lever 1 is inserted between the wheel flange 7 of the rim 2 and the heel 6 of the side wall 5 as shown in FIG. 2. The mounting head 14 engages the mounting level 1 and moves it to the right as shown in FIG. 2 to lift the heel 6 of the tire 3 away from the rim 2 to create a space 8 between the rim 2 and the heel 6. The heel 5 of the tire 3 rests on the mounting lever 1 along a curved line 12 between two corner points of support 9a and 9b at edges 1a and 1b of the mounting lever 1. The heel 6 of the tire 3 applies substantial force to the lever 1 between the corner points 9a and 9b. However, because the surface of the mounting lever 1 is curved, the pressure distribution between the heel 6 of the tire 3 and mounting lever 1 is more uniform across the face of the mounting lever 1 and thus preferable. In contrast, conventional mounting levers having flat surface tend to exert very high pressures at the corner points and very little pressure between the corner points.

The mounting lever 1 can be made of any suitable material, but is preferably made of chrome-vanadium.

Figure 3:
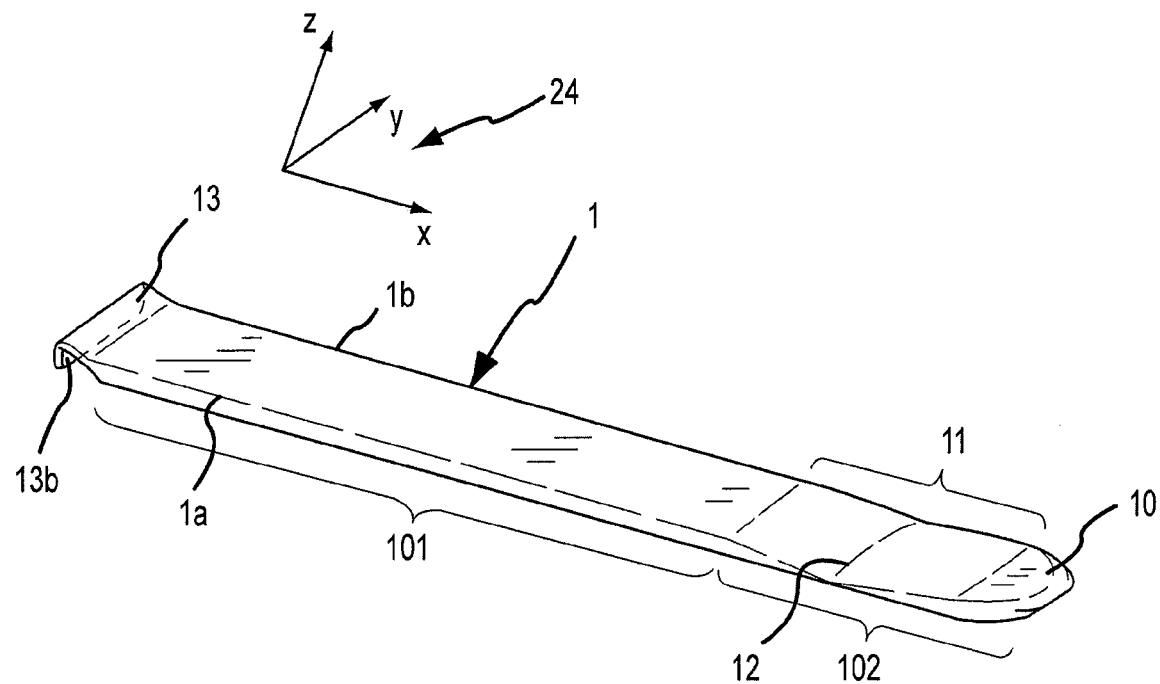
FIG. 3 is an isometric view showing a mounting lever according to one embodiment of the invention.

The mounting lever 1 is shown in greater detail in FIG. 3. In the following description the designations "front/back" are related to the orientation along the x-axis, the designations "left/right" are related to the orientation along the y-axis and the designations "up/down" are related to the orientation along the z-axis of a Cartesian coordinate system 24. The mounting lever 1 has a hook 13 at its back end, which can engage a wheel flange when mounting a tire on a wheel without the use of a disk machine. The mounting lever 1 has a handle portion 101 adjacent thereto, which extends into the front third of the mounting lever 1. In the embodiment shown in FIG. 1, the handle portion 101 has a rectangular profile.

A working portion 102 is located adjacent to the handle portion 101 in the front part of the mounting lever 1. The front end of the working portion 102 is formed by a rounded end part 10, which, in the embodiment shown, is configured trapezoidally. The trapezoidal shape of the end part 10 allows the mounting lever 1 to more easily be inserted between the wheel flange 7 and the heel 6 of the tire 3.

Behind the end part 10, the working portion 102 has a mounting surface 11 that is convex at the middle of the working portion 102 along line 12 so that the height of the mounting lever 1 at the middle of the working portion 102 is lowest at its sides 1a and 1b and greatest in its middle. However, the mounting surfaces changes from convex at the middle of the working portion 102 to a substantially rectangular profile towards the rounded end part 10 of the working portion 102. Thus, the convexity of the profile of the mounting surface 11 of the working portion 102 changes over its length, and it is greatest in the middle of the working surface 102 along line 12. Shaping the mounting lever 1 in this manner prevents the heel 6 of the tire 3 from slipping off the mounting lever 1 during use of the mounting lever 1. Furthermore, the convex profile of the mounting surface 11 allows the heel 6 of the tire 3 to rests with a more uniform force on the entire width of the mounting lever 1.

Figure 4:
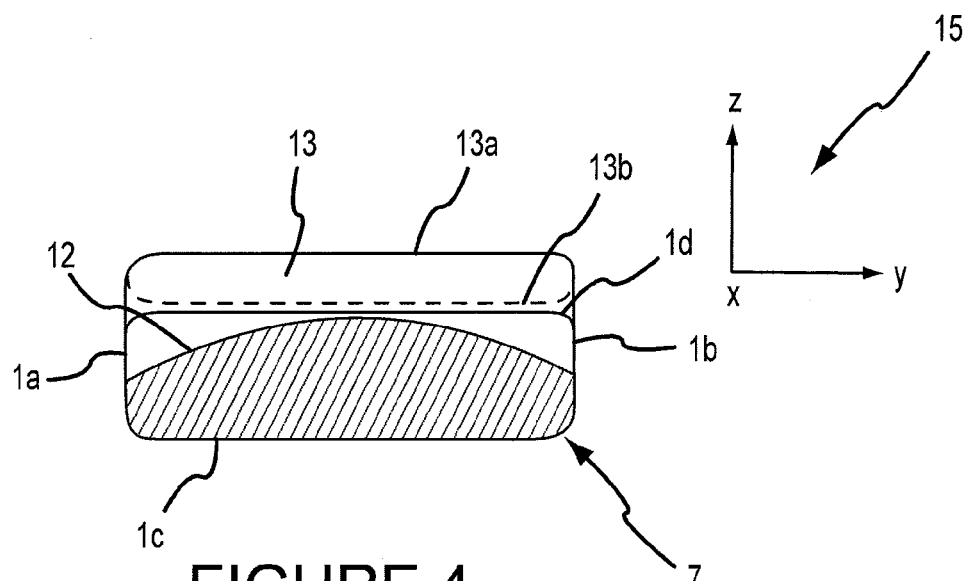
FIG. 4 shows a section of the mounting level of FIG. 3 taken along the middle line in FIG. 3 viewed towards the back end of the mounting lever.

The convex curvature of the mounting surface 11 is shown more clearly in FIG. 4, which shows a section along the line 12 in FIG. 3 looking away from the end portion 10 of the mounting lever 1. A second coordinate system 15 serves for a better orientation, the x-axis of which running vertically to the drawing plane. The edges 1a, 1b, 1c and 1d form the rectangular profile of the mounting lever 1 away from the line 12. The transition between adjacent edges is rounded at the same time. The lines 13a and 13b depict the upper and the lower edges of the hook 13, respectively, which is masked in this illustration. The convex curvature of the mounting surface 11 along line 12 is readily apparent in FIG. 4.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A mounting lever adapted to dismantle a vehicle tire from a rim, the mounting lever comprising an elongated member having a width defining a first side and a second side and having a length with a distal end and a proximate end, the elongated member having a handle portion having a first end adjacent the distal end and a working portion having a first end defining the proximate end of the elongated member and a second end adjacent the handle portion, the handle portion and the first end of the working portion having a substantially rectangular profile, the working portion having a mounting surface located between the first end and the second end of the working portion, a side profile of the mounting surface having a first height at a proximal end adjacent the first end of the working portion that smoothly transitions to a second height at a middle portion of the mounting surface, the second height being less than the first height, the side profile having a third height at a distal end defining the second end of the working portion that smoothly transitions from the second height, the third height being substantially equal to the first height, the mounting surface having a convex curvature extending from the first side to the second side of the elongated member, wherein the curvature of the mounting surface changes along a length of the working portion, the middle portion of the mounting surface defining a curved line with the greatest convex curvature extending from the first side to the second side of the elongated member.

2. The mounting lever of claim 1 wherein the elongated member further comprises a rounded portion at its proximate end.

3. The mounting lever of claim 1 wherein the distal end of the elongated member is bent out of a plane occupied by the handle portion of the elongated member.

4. The mounting lever of claim 1, further comprising a hook formed at the distal end of the elongated member.

5. The mounting lever of claim 1 wherein the elongated member is made of chrome-vanadium.

* * * * *